United States Patent
Richard

(10) Patent No.: US 6,737,105 B2
(45) Date of Patent: May 18, 2004

(54) MULTILAYERED HYDROPHOBIC COATING AND METHOD OF MANUFACTURING THE SAME

(75) Inventor: David A. Richard, Shingles Springs, CA (US)

(73) Assignee: VTEC Technologies, Inc., Chestnut Hill, MA (US)

( * ) Notice: Subject to any disclaimer, the term of this patent is extended or adjusted under 35 U.S.C. 154(b) by 0 days.

(21) Appl. No.: 09/916,692

(22) Filed: Jul. 27, 2001

(65) Prior Publication Data

US 2003/0026965 A1 Feb. 6, 2003

(51) Int. Cl.⁷ .............................. B06D 5/06; B05D 1/36; C23C 16/00
(52) U.S. Cl. .................. 427/162; 427/163.1; 427/164; 427/165; 427/248.1; 427/255.7; 427/294; 427/402; 427/419.1; 427/419.2; 427/419.3
(58) Field of Search .............................. 427/162, 163.1, 427/164, 165, 248.1, 255.7, 294, 402, 419.1, 419.2, 419.3

(56) References Cited

U.S. PATENT DOCUMENTS

| | | | |
|---|---|---|---|
| 4,085,092 A | 4/1978 | Chang et al. | |
| 4,328,277 A | 5/1982 | Molari, Jr. | |
| 4,364,786 A | 12/1982 | Smith, Jr. et al. | |
| 4,382,832 A | 5/1983 | Uram, Jr. | |
| 4,391,924 A | 7/1983 | Uram, Jr. | |
| 4,683,171 A | 7/1987 | Kuga et al. | |
| 4,704,174 A | 11/1987 | Valimont et al. | |
| 4,725,662 A | 2/1988 | Kuga et al. | |
| 4,747,896 A | 5/1988 | Anastasie | |
| 4,810,583 A | 3/1989 | Brown et al. | |
| 4,844,983 A | 7/1989 | Parker et al. | |
| 5,002,820 A | 3/1991 | Bolton et al. | |
| 5,145,744 A | 9/1992 | Cartier et al. | |
| 5,277,944 A | 1/1994 | Holzer et al. | |
| 5,443,912 A | 8/1995 | Olson | |
| 5,445,871 A | * 8/1995 | Murase et al. | 428/215 |
| 5,506,051 A | 4/1996 | Levy-Borochov et al. | |
| 5,506,057 A | 4/1996 | Olson | |
| 5,622,784 A | * 4/1997 | Okaue et al. | 428/447 |
| 5,639,538 A | 6/1997 | Wong | |
| 5,648,149 A | 7/1997 | Rukavina et al. | |
| 5,840,429 A | 11/1998 | Rukavina et al. | |
| 5,930,046 A | * 7/1999 | Solberg et al. | 359/580 |
| 6,207,236 B1 | 3/2001 | Araki et al. | |
| 2001/0031365 A1 | 10/2001 | Anderson et al. | |

FOREIGN PATENT DOCUMENTS

WO    WO 00/72053    11/2000

* cited by examiner

Primary Examiner—Michael Barr

(57) ABSTRACT

A multi-layer coating for a transparent substrate, such as glass, plastic, or other transparent material, which increases the durability and weatherability of the substrate. The coating includes a surface-hardening layer of organo-siloxane formed over the substrate. An abrasion-resistant coating comprising a multi-layer stack of alternating layers of silicon dioxide and zirconium dioxide is formed over the surface-hardening layer. The multi-layer coating further includes a hydrophobic outer layer of perfluoroalkylsilane formed over the abrasion-resistant coating to form an outer moisture-resistant surface. This multi-layer coating configuration increases the abrasion resistance and mechanical strength of the transparent substrate on which it is formed without imparting color to the transparent substrate.

22 Claims, 1 Drawing Sheet

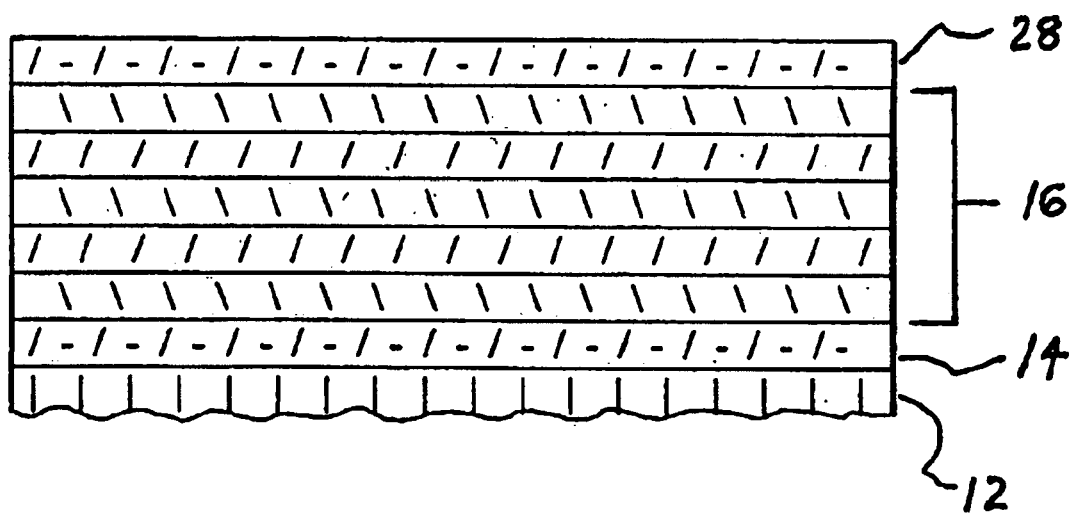

MULTILAYERED HYDROPHOBIC COATING AND METHOD OF MANUFACTURING THE SAME

BACKGROUND OF THE INVENTION

1. Field of the Invention

The present invention relates generally to a coating for a transparent substrate. More particularly, the present invention is directed to a multilayered hydrophobic coating for a transparent substrate and method for the manufacture of the same.

2. Description of Related Art

At present, automobile windows and mirrors are typically formed of glass. History has shown numerous disadvantages exist with utilizing glass in automobiles. Glass tends to add a significant amount of weight to automobile, and glass can pose a safety threat to passengers inside the automobile as glass has a tendency to shatter upon breakage. It is highly desirable to provide shatter-resistant glass surfaces in automobiles and other vehicles or to utilize other materials which do not tend to shatter. There are advantages which may be achieved by using highly transparent, optical quality plastic in place of glass. Plastic is lighter, tougher and less likely to fracture than glass. There is a demand for fully practical plastic windows and mirrors in the automotive industry due to its lightweight nature that contributes to the reduction of the gross weight of the vehicle. Further, plastic is advantageous due to its non-breakableness that is favorable to the safety of the driver in case of an accident.

One problem associated with plastic substrates, such as those used in windows and mirrors, is their significantly limited operational service life resulting from warpage or distortion due to the hygroscopic properties of the polymers used in forming the plastic substrate. Unlike its glass counterpart, a plastic substrate formed with a polymer-based material will gradually absorb moisture from the surrounding atmosphere. Over time, the absorption of moisture, coupled with variations in other climatic conditions, causes the polymer-based material to expand and contract. The moisture permeability of various coatings applied to both sides of a plastic substrate will often lead to different amounts of moisture being absorbed by the opposing surfaces of the plastic substrate, thus resulting in uneven expansion and contraction. This can cause a loss in optical clarity through the plastic substrate.

There is a need to provide a coating for a transparent substrate which provides increased durability and weatherability of the transparent substrate while maintaining a desired optical clarity. Furthermore, there is also a need for an improved coating for a transparent substrate which provides added protection against abrasions and impact damage.

SUMMARY OF THE INVENTION

The foregoing shortcomings and disadvantages of the prior art are alleviated by the present invention that provides a multi-layer coating which increases the durability and weatherability of a transparent substrate, such as glass, plastic, or other transparent material. The multi-layer coating includes a surface-hardening layer of organo-siloxane formed over the transparent substrate. An abrasion-resistant coating comprising a stack of alternating layers of silicon dioxide and zirconium dioxide is formed over the surface-hardening layer. The multi-layer coating includes a hydrophobic outer layer of perfluoroalkylsilane formed over the abrasion-resistant coating. This multi-layer coating configuration provides a surface for the transparent substrate which resists abrasions and absorbs mechanical stresses while providing an improved weather-resistant barrier for the substrate.

BRIEF DESCRIPTION OF THE DRAWING

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

The FIGURE is a cross-sectional view of a preferred embodiment of the multi-layer coating of the present invention.

DETAILED DESCRIPTION OF THE PREFERRED EMBODIMENT

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a multi-layer coating for a transparent substrate.

Referring now to FIG. 1, a cross-sectional view of a preferred embodiment of the multi-layer coating 10 of the present invention is illustrated. The coating 10 is formed over a transparent substrate 12, such as a window or mirror for vehicles, aircraft, or buildings. The substrate 12 may a plastic or polymer-based material, glass, a laminate, or other type of transparent material. A surface-hardening layer 14 is formed on the substrate 12 in order to increase the hardness of the surface of the substrate 12. The surface-hardening layer 14 has a base of an organo-silicone (methylpolysiloxane) polymer with a thickness of approximately 2 to 10 microns, preferably approximately 2 to 3 microns. Furthermore, when the substrate 12 is formed of a polymer-based material, it is possible for some unreacted monomers to remain on the surface of the substrate 12 as well as within the substrate 12 itself. The organo-silicone surface-hardening layer 14 also serves as a tie-bond coating to eliminate any detrimental effects which these monomers may cause by rendering the substrate 12 virtually chemically inert. This organo-silicone material is sprayed, dipped, or centrifugally coated onto the substrate 12 to form a tie-bond layer 14 on its surface. A typical organo-silicone is one prepared from triethoxymethyl silane $CH_3Si(OC_2H_5)_3$. The surface-hardening layer 14 is, generally, permeable to humidity, for example, the rate of moisture absorption through the organo-silicone silane is about 3 $g/m^2$ per 24 hours when tested in an atmosphere maintained at 50° C. with 98% room humidity.

The coating 10 further includes an abrasion-resistant coating 16 formed over the surface-hardening layer 14 to provide an additional degree of surface-hardening as well as increased resistance to abrasion. The abrasion-resistant coating 16 is preferably formed in a stacked configuration comprising alternating layers of zirconium dioxide ($ZrO_2$) and silicon dioxide ($SiO_2$). A abrasion-resistant coating 16 of the following construction has been found to provide optimal levels of abrasion resistance, optical transmission, and absence of color: a $SiO_2$ layer 18 of approximately 2616 angstrom, a $ZrO_2$ layer 20 of approximately 246 angstrom, a $SiO_2$ layer 22 of approximately 174 angstrom, a $ZrO_2$ layer 24 of approximately 765 angstrom, and a $SiO_2$ layer 26 of approximately 907 angstrom.

A hydrophobic coating 28 is formed over the abrasion-resistant coating 16 to provide a weather-resistant barrier resistant to moisture permeability. The hydrophobic coating 28 is preferably perfluoroalkylsilane which forms a strongly adherent fluorised siloxane coating on the outer surface of the abrasion-resistant coating 16. The preferred thickness of the perfluoroalkylsilane coating 28 is approximately 100 Angstrom. Coating 28 can be formed with a thickness of approximately 5–20 nm. Prior to forming the hydrophobic coating 28, the surface of the abrasion-resistant coating 16 may be cleaned under vacuum by a glow discharge with the principle discharge medium being oxygen and a potential between approximately 2500 to 3500 VAC applied across the discharge electrodes.

The preferred thicknesses of the various layers of the multi-layer coating 10 were selected to provide optimal levels of reflectivity and transmission without imparting color to the substrate 12. The composition and thicknesses of the various layers were found to provide increased weatherability and durability while minimizing any effect which coloring could have on the optical performance of the transparent substrate 12 to which the multi-layer coating 10 is applied. The various layers of the multi-layer coating 10 formed in accordance with the preferred composition and thicknesses possess the following stack densities: the surface-hardening layer 14 is 6%, the $SiO_2$ layer 18 is 55%, the $ZrO_2$ layer 20 is 55%, the $SiO_2$ layer 22 is 4%, $Zr_{O_2}$ layer 24 is 16%, $SiO_2$ layer 26 is 20%, and the hydrophobic layer 28 is 2%. The stack density is the density of the crystalline forms of the material constituting a respective layer. However, it is understood that various layers of the multi-layer coating 10 may comprise other thicknesses which achieve the effects of the present invention and it is not the intention of the inventor of the present invention to limit the multi-layer coating 10 to these preferred thicknesses.

By utilizing alternating layers of $SiO_2$ and $ZrO_2$ in the abrasion-resistant coating 16 in combination with the hydrophobic perfluoroalkylsilane layer 28, the multi-layer coating 10 of the present invention provides a abrasion-resistant and weather-resistant barrier. The layers of the abrasion-resistant coating 16 and the hydrophobic layer 28 are both dry coatings formed by any known dry coating technique, such as vacuum deposition or ion assisted deposition. By utilizing a dry coating technique, a more uniform, flawless multi-layer coating 10 can be achieved which is not readily achievable through wet coating techniques. Wet coatings are not ductile and tend to craze, resulting in fissures forming in the coatings where moisture can penetrate. By forming the abrasion-resistant coating 16 and the hydrophobic layer 28 through a dry coating technique, the likelihood of these fissures forming is reduced significantly. Furthermore, the compositions of the abrasion-resistant coating 16 and the hydrophobic layer 28 are selected to have matching thermal coefficients of expansion, so that the various layers within the multi-layer coating 10 expand and contract in a substantially uniform manner under all temperatures and conditions to which the coating 10 is exposed. The thermal coefficient of expansion of the multi-layer coating 10 may further be matched against the substrate 12 itself, so that they expand and contract in a substantially uniform manner. By matching the thermal coefficients of expansion of the various layers, the bonds formed between the layers are maintained in a secure manner to prevent the leakage of moisture there through.

In order to illustrate the added protection which the multi-layer coating 10 of the present invention provides to the substrate 10, several Taber abrasion tests were conducted on polycarbonate and acrylic sheets coated with the multi-layer coating 10 of the present invention and compared with the same tests performed on similar sheets coated with conventional silicone hardcoats comprising a polysiloxane polymer. The following table shows the results these abrasion tests on the surfaces of the polycarbonate and acrylic sheets.

| Results of typical Taber abrasion tests after 300 cycles | | | |
|---|---|---|---|
| Coating type | Substrate | Primer required | Abrasion damage |
| Commercial silicone hardcoats | Polycarbonate | Yes | 4.1% |
| (polysiloxane polymers) | Acrylic | Yes | 7.5% |
| Multi-layer Coating 10 | Polycarbonate | No | 1.8% |
| | Acrylic | No | 2.8% |

The above results illustrate the multi-layer coating 10 of the present invention significantly reduced the amount of abrasion damage to both the polycarbonate and acrylic sheets which were tested. As can be seen, a multi-layer coating 10 formed in accordance with the present invention affords a substrate 12 improved durability and resistance to abrasion.

The present invention describes a multi-layer coating 10 which may applied to substrates 12 possessing a variety of shapes and configurations. The coating 10 is preferably formed on a window or mirror in an automobile or other vehicle, but it is understood that the coating 10 may be utilized in other suitable applications as well. A coating 10 formed in accordance with the present invention adds to the mechanical strength, durability, moisture-resistance, and abrasion resistance of the substrate 12 to which it is applied without imparting detrimental coloring to the transparent substrate 12. The multi-layer coating 10 of the present invention further provides an added resistance to climatic stresses to the substrate 12 and further provides increased weatherability by providing a more weather resistant barrier to water infusion.

In each of the above embodiments, the different structures of the multi-layer coating are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of forming a transparent multi-layer coating over a substrate comprising:

forming an organo-silicon polymer surface-hardening layer over said substrate;

forming a multi-layer abrasion-resistant coating over said organo-silicone polymer surface-hardening layer by sequentially depositing a plurality of alternating layers of silicon dioxide and zirconium dioxide of respectively different thicknesses over said organo-silicone polymer surface-hardening layer using a dry coating technique; and depositing a transparent perfluorinated hydrophobic coating over said abrasion-resistant coating using a dry coating technique.

2. The method of claim 1, wherein said abrasion-resistant coating and said transparent perfluorinated hydrophobic coating are dry coatings which are formed by a vacuum deposition technique.

3. The method of claim 1, wherein said abrasion-resistant coating is formed to sequentially comprise a silicon dioxide layer, a zirconium dioxide layer, a silicon dioxide layer, a zirconium dioxide layer, and a silicon dioxide layer.

4. The method of claim 3, wherein said abrasion-resistant coating is formed to sequentially comprise a silicon dioxide layer of approximately 907 angstrom, a zirconium dioxide layer of approximately 765 angstrom, a silicon dioxide layer of approximately 174 angstrom, a zirconium dioxide layer of approximately 246 angstrom, and a silicon dioxide layer of approximately 2616 angstrom.

5. The method of claim 1, wherein said transparent perfluorinated hydrophobic coating comprises perfluoroalkylsilane.

6. The method of claim 5, wherein said perfluoroalkylsilane coating is formed to have a thickness of approximately 5–20 nm.

7. The method of claim 1, wherein said transparent perfluorinated hydrophobic coating and said abrasion-resistant coating have substantially equal thermal coefficients of expansion.

8. The method of claim 1, wherein organo-silicon polymer material is triethoxymethyl silane.

9. The method of claim 1, wherein said organo-silicon layer is formed to have a thickness of approximately 2–3 microns.

10. The method of claim 1, wherein said coating is formed on a glass substrate.

11. The method of claim 1, wherein said coating is formed on a polymer-based substrate.

12. A method of forming a transparent multi-layer coating over a transparent plastic substrate to provide abrasion-resistant and hydrophobic properties comprising the steps of;

providing a transparent plastic substrate;

forming an organo-silicon tie-bond layer on the plastic substrate;

forming a multi-layer abrasion-resistant coating of alternating layers of silicon dioxide and zirconium dioxide over the tie-layer wherein a thickness of a first layer adjacent the tie-layer is larger than each respective subsequent layer; and depositing a transparent perfluorinated hydrophobic coating over the abrasion-resistant coating with a dry coating technique wherein the thicknesses of each layer and corresponding thermal coefficients of expansion cooperate to match a thermal coefficient of expansion of the plastic substrate over an operative predetermined thermal range.

13. The method of claim 12 wherein the transparent perfluorinated hydrophobic coating is perfluoroalkylsilane.

14. The method of claim 13 wherein the tie-bond layer is a triethoxymethyl silane.

15. The method of claim 12 wherein the thickness of each alternating layer of the abrasion-resistant coating is different.

16. The method of claim 15 wherein the sum of the combined thicknesses of the silicon dioxide layers are at least three times greater than the sum of the combined thicknesses of the zirconium dioxide layers.

17. The method of claim 12 wherein a thickness of an outside layer of the abrasion-resistant coating is larger than any intermediate layer after the first layer.

18. A method of forming a transparent multi-layer coating over a transparent plastic substrate to provide abrasion-resistant and hydrophobic properties comprising the steps of:

providing a transparent plastic substrate from one of polycarbonate and acrylic;

forming an organo-silicon tie-bond layer on the plastic substrate;

forming a multi-layer abrasion-resistant coating of alternating layers of silicon dioxide and zirconium dioxide over the tie-bond layer wherein a thickness of a first layer adjacent the tie-bond layer is larger than each respective subsequent layer; and depositing a perfluoroalkylsilane coating over the multi-layer abrasion-resistant coating of sufficient thickness to make the plastic substrate hydrophobic, wherein the thicknesses of each layer and corresponding thermal coefficients of expansion cooperate to match a thermal coefficient of expansion of the plastic substrate over an operative predetermined thermal range.

19. The method of claim 18 wherein the tie-bond layer is triethoxymethyl silane.

20. The method of claim 19 wherein the thickness of each alternating layer of the abrasion-resistant coating is different.

21. The method of claim 20 wherein the sum of the combined thicknesses of the silicon dioxide layers is at least three times greater than the sum of the combined thickness of the zirconium dioxide layers.

22. The method of claim 21 where a thickness of an outside layer of the abrasion-resistant coating is larger than any intermediate layer after the first layer.

* * * * *